(12) United States Patent
Kanno et al.

(10) Patent No.: US 11,431,001 B2
(45) Date of Patent: Aug. 30, 2022

(54) FUEL CELL

(71) Applicant: TOYOTA JIDOSHA KABUSHIKI KAISHA, Toyota (JP)

(72) Inventors: Daisuke Kanno, Toyota (JP); Yoshihiro Yamagata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/125,143

(22) Filed: Dec. 17, 2020

(65) Prior Publication Data

US 2021/0104754 A1 Apr. 8, 2021

Related U.S. Application Data

(62) Division of application No. 16/044,846, filed on Jul. 25, 2018, now Pat. No. 11,063,270.

(30) Foreign Application Priority Data

Sep. 22, 2017 (JP) .................................. 2017-182694

(51) Int. Cl.
*H01M 8/0273* (2016.01)
*H01M 8/0267* (2016.01)
(Continued)

(52) U.S. Cl.
CPC ....... *H01M 8/0273* (2013.01); *H01M 8/0247* (2013.01); *H01M 8/0267* (2013.01);
(Continued)

(58) Field of Classification Search
CPC ............. H01M 8/0273; H01M 8/0267; H01M 8/04119; H01M 8/04149; H01M 8/0297; H01M 8/0247; H01M 8/2483
See application file for complete search history.

(56) References Cited

U.S. PATENT DOCUMENTS

| 2007/0048587 A1 | 3/2007 | Yagi et al. |
| 2010/0003580 A1 | 1/2010 | Shirahama |
| 2013/0209909 A1* | 8/2013 | Sugiura ................. H01M 8/241 |
| | | 429/434 |

FOREIGN PATENT DOCUMENTS

| CN | 1805190 A | 7/2006 |
| CN | 1921207 A | 2/2007 |
| | (Continued) | |

OTHER PUBLICATIONS

U.S. Appl. No. 16/044,846, filed Jul. 25, 2018.
Notice of Allowance issued in U.S. Appl. No. 16/044,846 dated Feb. 5, 2021.

*Primary Examiner* — Karie O'Neill Apicella
(74) *Attorney, Agent, or Firm* — Finnegan, Henderson, Farabow, Garrett & Dunner, LLP

(57) ABSTRACT

A fuel cell includes: a membrane electrode gas diffusion layer assembly; a frame member which surrounds the membrane electrode gas diffusion layer assembly; and a pair of separators with the frame member and the membrane electrode gas diffusion layer assembly sandwiched therebetween. The separators include a manifold hole through which a reaction gas is supplied or discharged. The frame member includes a manifold opening which communicates with the manifold hole, an in-plane opening in which the membrane electrode gas diffusion layer assembly is disposed, a gas flow path which communicates with the in-plane opening and the manifold opening, a seal portion which is welded to the separators around the gas flow path, and an accommodation portion which is provided between the seal portion and the gas flow path to accommodate a material of the frame member caused to flow by welding.

4 Claims, 9 Drawing Sheets

(51) Int. Cl.
*H01M 8/0297* (2016.01)
*H01M 8/0247* (2016.01)
*H01M 8/2483* (2016.01)
*H01M 8/04119* (2016.01)

(52) U.S. Cl.
CPC ..... *H01M 8/0297* (2013.01); *H01M 8/04149* (2013.01); *H01M 8/2483* (2016.02)

(56) References Cited

FOREIGN PATENT DOCUMENTS

| | | |
|---|---|---|
| CN | 101529627 A | 9/2009 |
| JP | 2008-108516 A | 5/2008 |
| JP | 2014-017150 | 1/2014 |
| JP | 2017-117780 A | 6/2017 |

* cited by examiner

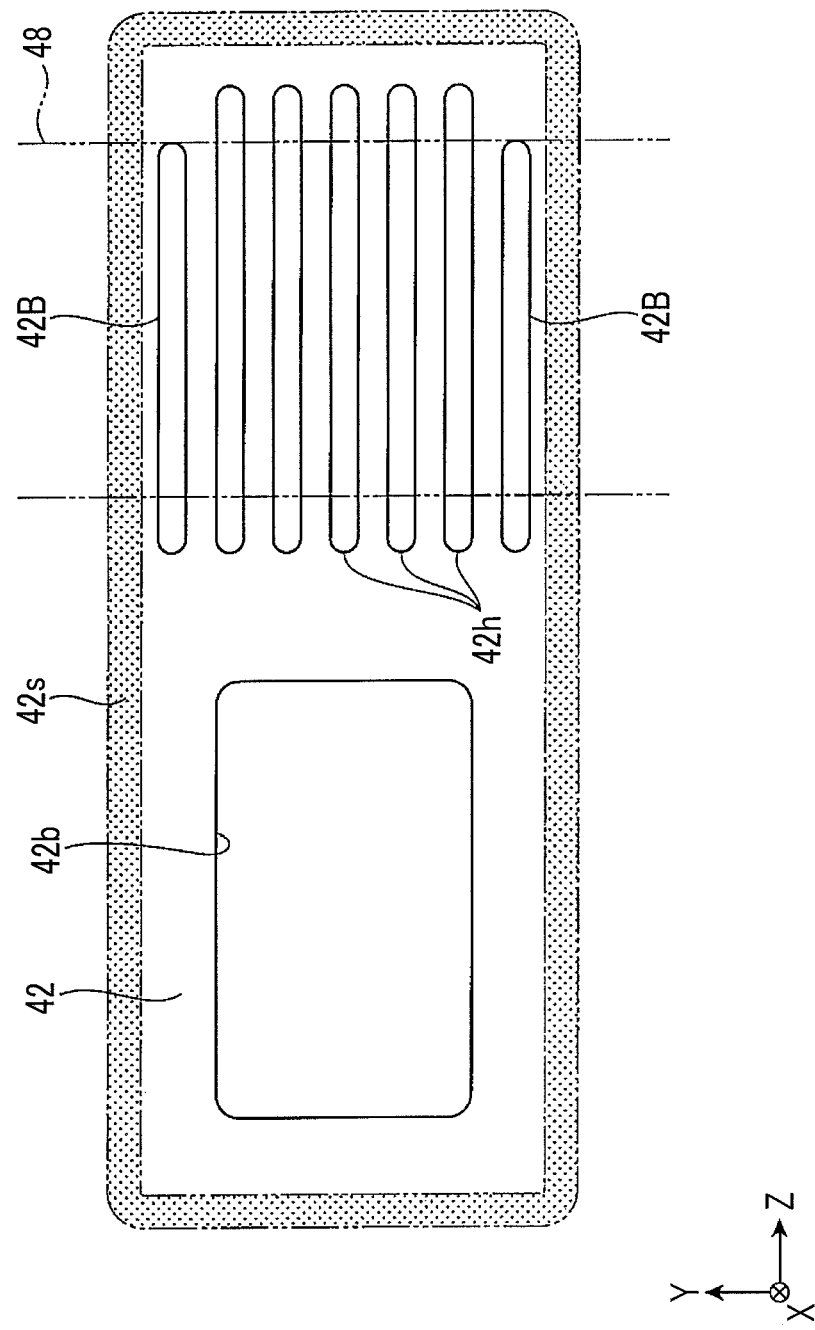

FUEL CELL

INCORPORATION BY REFERENCE

This application is a divisional of U.S. patent application Ser. No. 16/044,846, filed on Jul. 25, 2018, which claims the benefit of Japanese Patent Application No. 2017-182694, filed on Sep. 22, 2017, which are both incorporated herein by reference in their entirety.

BACKGROUND

1. Technical Field

The present disclosure relates to a fuel cell.

2. Description of Related Art

In the related art, a disclosure related to a fuel cell module is known (refer to Japanese Unexamined Patent Application Publication No. 2017-117780 (JP 2017-117780 A)). An object of the fuel cell module described in JP 2017-117780 A is to suppress an excessive increase in the thickness of the fuel cell module in a stacking direction of unit cells. The unit cell includes a frame member disposed to surround the outer periphery of a membrane electrode gas diffusion layer assembly (MEGA), and two separators.

The frame member includes a manifold opening that communicates with manifold holes provided in the two separators, an in-plane opening in which the MEGA is disposed, and a slit-shaped first through-hole as a reaction gas flow path provided between the manifold opening and the in-plane opening.

In one of the two separators, in a plan view, a recessed portion is formed at a position on a line that passes through the center of the first through-hole along the minor axis direction of the first through-hole of the frame member. The width of the bottom surface of the recessed portion measured along the major axis direction of the first through-hole is smaller than the width of the first through-hole measured along the major axis direction. A seal member is disposed in the recessed portion.

In the fuel cell module of the related art, the seal member for sealing a gap between the unit cells is disposed in the recessed portion of the separator. Therefore, the thickness of the fuel cell module in the stacking direction of the unit cells is decreased by the depth of the recessed portion, and an excessive increase in the thickness of the fuel cell module in the stacking direction can be suppressed.

SUMMARY

In the fuel cell module of the related art, for example, the unit cell is manufactured by sandwiching the MEGA and the frame member between a pair of separators to form a stacked body, and integrating the stacked body by heat pressing. There is a possibility that the frame member made of a resin may be melted by the heat pressing and the melted resin mentioned above may flow into the slit-shaped first through-hole as the reaction gas flow path formed between the manifold opening and the in-plane opening. When the resin flows into the first through-hole and the opening size of the first through-hole decreases, there is a possibility that the pressure loss of a reaction gas may increase and the supply of the reaction gas may become nonuniform.

The present disclosure provides a fuel cell capable of suppressing an increase in the pressure loss of a reaction gas and thus uniformly supplying the reaction gas.

An aspect of the disclosure relates to a fuel cell including a membrane electrode gas diffusion layer assembly, a frame member which surrounds the membrane electrode gas diffusion layer assembly, and a pair of separators with the frame member and the membrane electrode gas diffusion layer assembly sandwiched therebetween. The separators include a manifold hole through which a reaction gas is supplied or discharged. The frame member includes a manifold opening which communicates with the manifold hole, an in-plane opening in which the membrane electrode gas diffusion layer assembly is disposed, a gas flow path which communicates with the in-plane opening and the manifold opening, a seal portion which is welded to the separators around the gas flow path, and an accommodation portion which is provided between the seal portion and the gas flow path to accommodate a material of the frame member caused to flow by welding.

In order to construct the fuel cell according to the aspect of the disclosure, first, the membrane electrode gas diffusion layer assembly is disposed in the in-plane opening of the frame member, and the frame member and the membrane electrode gas diffusion layer assembly are disposed between the separators, thereby forming a stacked body. The stacked body is placed between molds, and a portion of the frame member is melted by performing heat pressing through which heat is applied while a pressure is applied, so that the frame member and the separators are welded together. As described above, the seal portion welded to the separators is formed in the frame member around the gas flow path. At this time, there may be cases where a portion of the material of the frame member is heated and melted between the separators and is caused to flow from the seal portion toward the gas flow path by pressurization.

Here, as described above, the frame member of the fuel cell according to the aspect of the disclosure includes the accommodation portion which is provided between the seal portion and the gas flow path to accommodate the material of the frame member caused to flow by welding. Therefore, even if a portion of the material of the frame member is melted and caused to flow from the seal portion toward the gas flow paths by welding, the portion of the material is accommodated by the accommodation portion. As described above, a blockage in the gas flow path by the material of the frame member caused to flow by the welding can be suppressed, and a decrease in the opening size of the gas flow path can be suppressed. Therefore, with the fuel cell of the aspect of the disclosure, an increase in the pressure loss of the reaction gas is suppressed, so that the reaction gas can be uniformly supplied.

In the fuel cell according to the aspect, the gas flow path and the accommodation portion may be slit-shaped through-holes. As described above, the accommodation portion can act as a dummy gas flow path which receives the material of the frame member caused to flow by the welding instead of the gas flow path which is narrow in width and is easily blocked. Therefore, a blockage in the gas flow path by the material of the frame member can be more effectively suppressed. In a process of forming the gas flow path in the frame member, the accommodation portion can be formed similar to the gas flow path.

In the fuel cell according to the aspect, a first end of the accommodation portion may communicate with the manifold opening. For example, there may be cases where moisture generated by a reaction between a fuel gas and an oxidant gas may infiltrate into the accommodation portion via slight gaps between the frame member and the separators which abut each other. Even in this case, when the first end of the accommodation portion communicates with the manifold opening, the moisture infiltrated into the accommodation portion is discharged toward the manifold opening, so that accumulation of water in the accommodation portion can be suppressed.

In the fuel cell according to the aspect, the gas flow path and the accommodation portion may have a slit extending from the manifold opening toward the in-plane opening, and a length of the accommodation portion in a first extension direction in which the accommodation portion extends is shorter than a length of the gas flow path in a second extension direction in which the gas flow path extends. As described above, the sealability between the fuel cells can be improved by increasing the contact area between the frame member and the separators.

In the fuel cell according to the aspect, in a third direction intersecting the second extension direction of the gas flow path, an interval d between the gas flow paths adjacent to each other is the same as a width of the gas flow path. As described above, the sealability between the frame member and the separators or the sealability between the stacked fuel cells can be improved by stabilizing the contact between the frame member and the separators.

In the fuel cell according to the aspect, in the third direction intersecting the second extension direction of the gas flow path, the width of the gas flow path is the same as a width of the accommodation portion. As described above, the sealability between the frame member and the separators or the sealability between the stacked fuel cells can be improved by stabilizing the contact between the frame member and the separators.

According to the aspect of the disclosure, it is possible to provide a fuel cell capable of uniformly supplying a reaction gas by suppressing an increase in the pressure loss of the reaction gas.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is an enlarged view of a frame member illustrating a modification example of the fuel cell illustrated in FIG. 1.

DETAILED DESCRIPTION OF EMBODIMENTS

Hereinafter, an example of a fuel cell according to an embodiment will be described with reference to the drawings.

Figure 1:
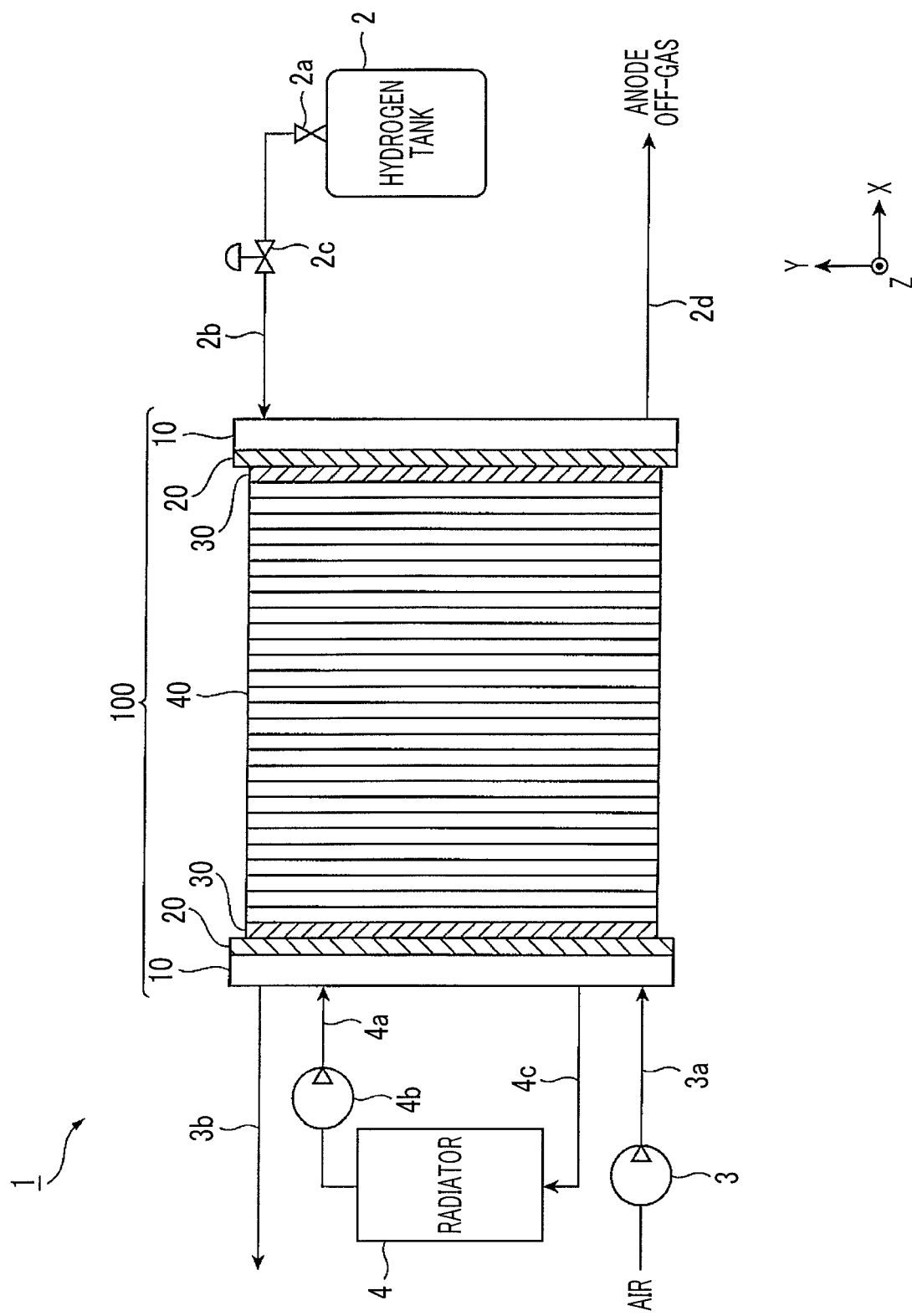
FIG. 1 is a schematic view of a fuel cell system provided with a fuel cell according to an embodiment.

FIG. 1 is a schematic view of a fuel cell system 1 according to the embodiment. For example, the fuel cell system 1 includes a hydrogen tank 2, an air pump 3, a radiator 4, and a fuel cell module 100.

For example, the hydrogen tank 2 is filled with high-pressure hydrogen, is connected to the fuel cell module 100 via a shut valve 2a, a pipe 2b, and a regulator 2c, and supplies hydrogen as a fuel gas to the fuel cell module 100. The fuel gas (anode off-gas) which has not been used in the fuel cell module 100 is discharged to the outside of the fuel cell module 100 via a discharge pipe 2d connected to the fuel cell module 100. The fuel cell system 1 may have a recirculation mechanism for recirculating the anode off-gas to the pipe 2b side.

For example, the air pump 3 is connected to the fuel cell module 100 via a pipe 3a and supplies air as an oxidant gas to the fuel cell module 100. The oxidant gas (cathode off-gas) which has not been used in the fuel cell module 100 is discharged to the outside of the fuel cell module 100 via the discharge pipe 3b. The fuel gas and the oxidant gas are also called reaction gases.

For example, the radiator 4 is connected to the fuel cell module 100 via a pipe 4a and a pump 4b and supplies a cooling medium for cooling the fuel cell module 100 to the fuel cell module 100. The cooling medium discharged from the fuel cell module 100 circulates through a pipe 4c to the radiator 4. As the cooling medium, for example, water, non-freezing water such as ethylene glycol, or air is used. In this example, water (also referred to as "coolant") is used as the cooling medium.

The fuel cell module 100 has a stacked structure in which an end plate 10, an insulating plate 20, a current collector plate 30, a plurality of fuel cells 40, a current collector plate 30, an insulating plate 20, and an end plate 10 are stacked in this order. In the drawings, for description of the configuration of each part, there may be cases where a Cartesian coordinate system in which a horizontal direction which is a stacking direction of the fuel cells 40 is referred to as a direction X, a vertical direction is referred to as a direction Y, and a horizontal direction which is perpendicular to the direction Y and the direction X is referred to as a direction Z. The directions X and Z may not need to be the horizontal direction, and the direction Y may not need to be the vertical direction.

Figure 2:
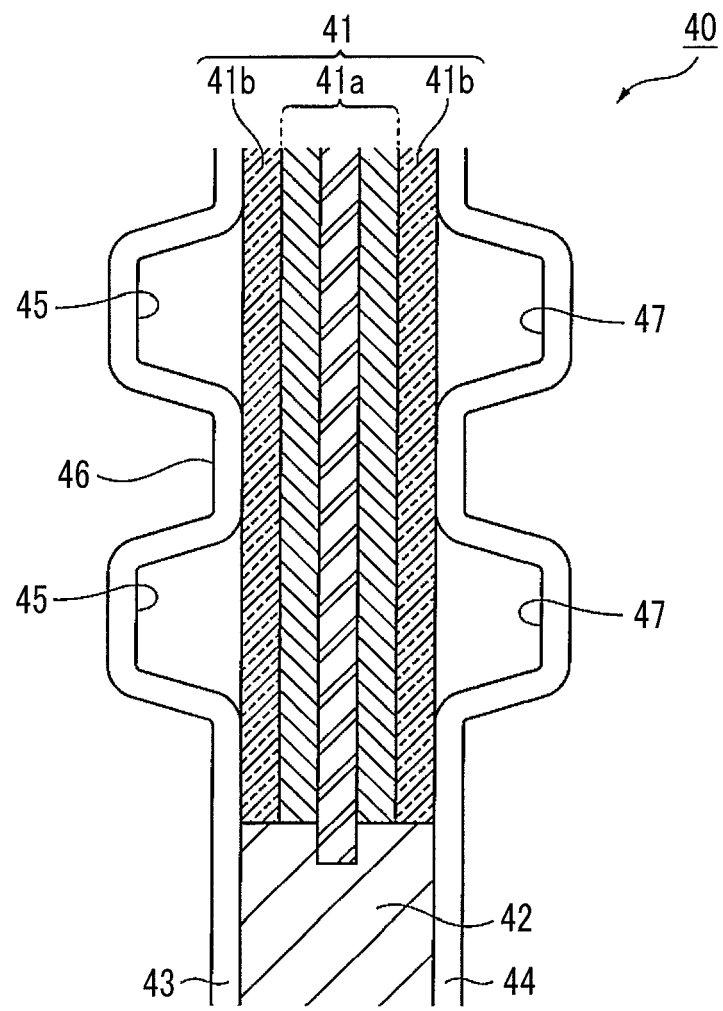
FIG. 2 is an enlarged sectional view of the fuel cell illustrated in FIG. 1.

FIG. 2 is a schematic enlarged sectional view of the fuel cell 40 illustrated in FIG. 1. The fuel cell 40 included in the fuel cell module 100 includes a membrane electrode gas diffusion layer assembly (MEGA) 41, a frame member 42 surrounding the MEGA 41, and a pair of separators with the frame member 42 and the MEGA 41 sandwiched therebetween, that is, an anode side separator 43 and a cathode side separator 44. The MEGA 41 includes a membrane electrode assembly 41a and gas diffusion layers 41b stacked on both sides of the membrane electrode assembly 41a. The membrane electrode assembly 41a is configured by respectively disposing an anode and a cathode on both sides of an electrolyte membrane.

The MEGA 41 and the frame member 42 are sandwiched between the anode side separator 43 and the cathode side separator 44 along the stacking direction X. The anode side separator 43 has a plurality of stripe-shaped flow path grooves 45 that distributes the fuel gas to the surface on the MEGA 41 side, and a plurality of stripe-shaped flow path grooves 46 that distributes the cooling medium to the surface on the opposite side to the MEGA 41. The cathode side separator 44 has a plurality of stripe-shaped flow path grooves 47 that distributes the oxidant gas to the surface on the MEGA 41 side.

Figure 3:
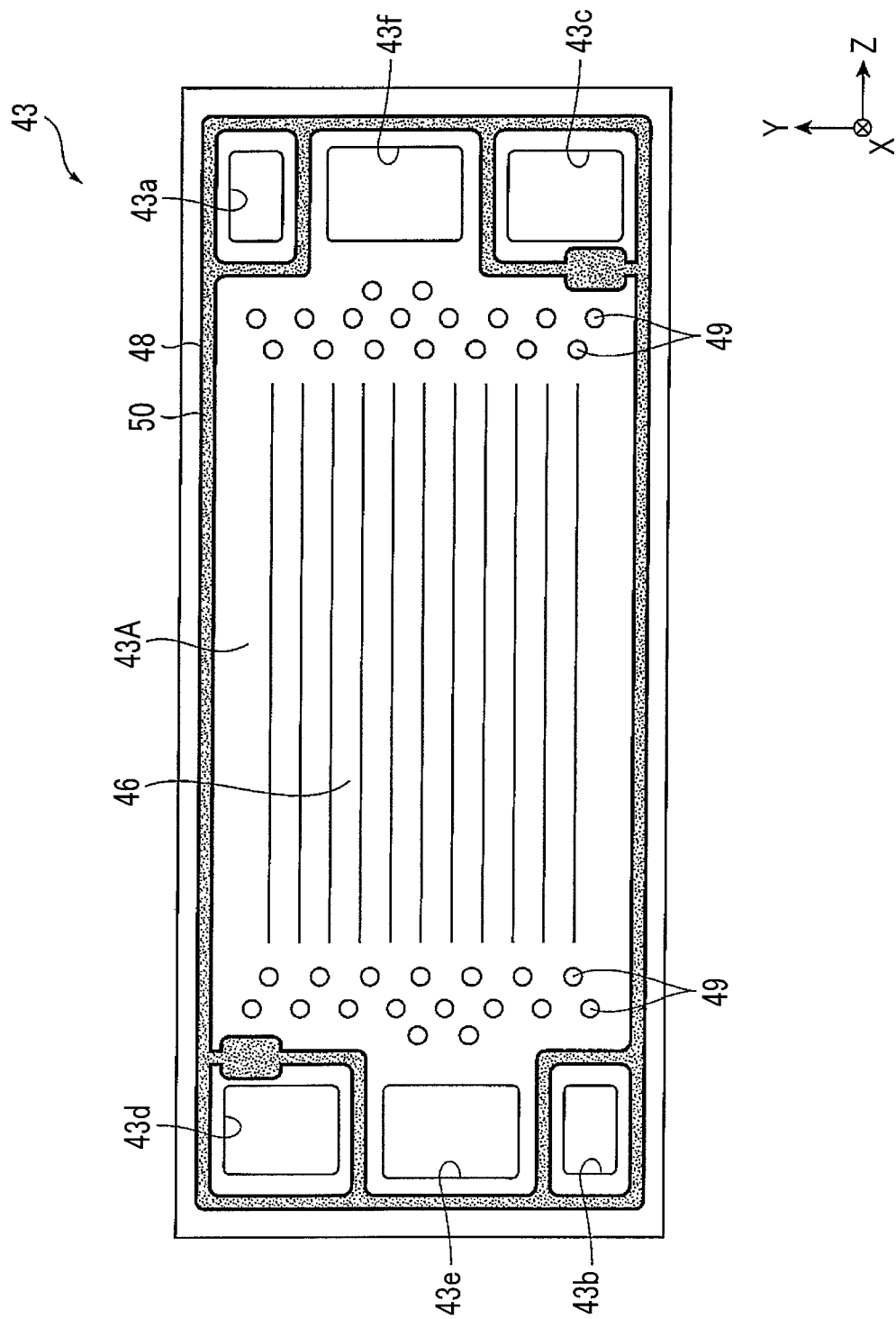
FIG. 3 is a plan view of an anode side separator of the fuel cell illustrated in FIG. 2 as viewed from the outside.
Figure 4:
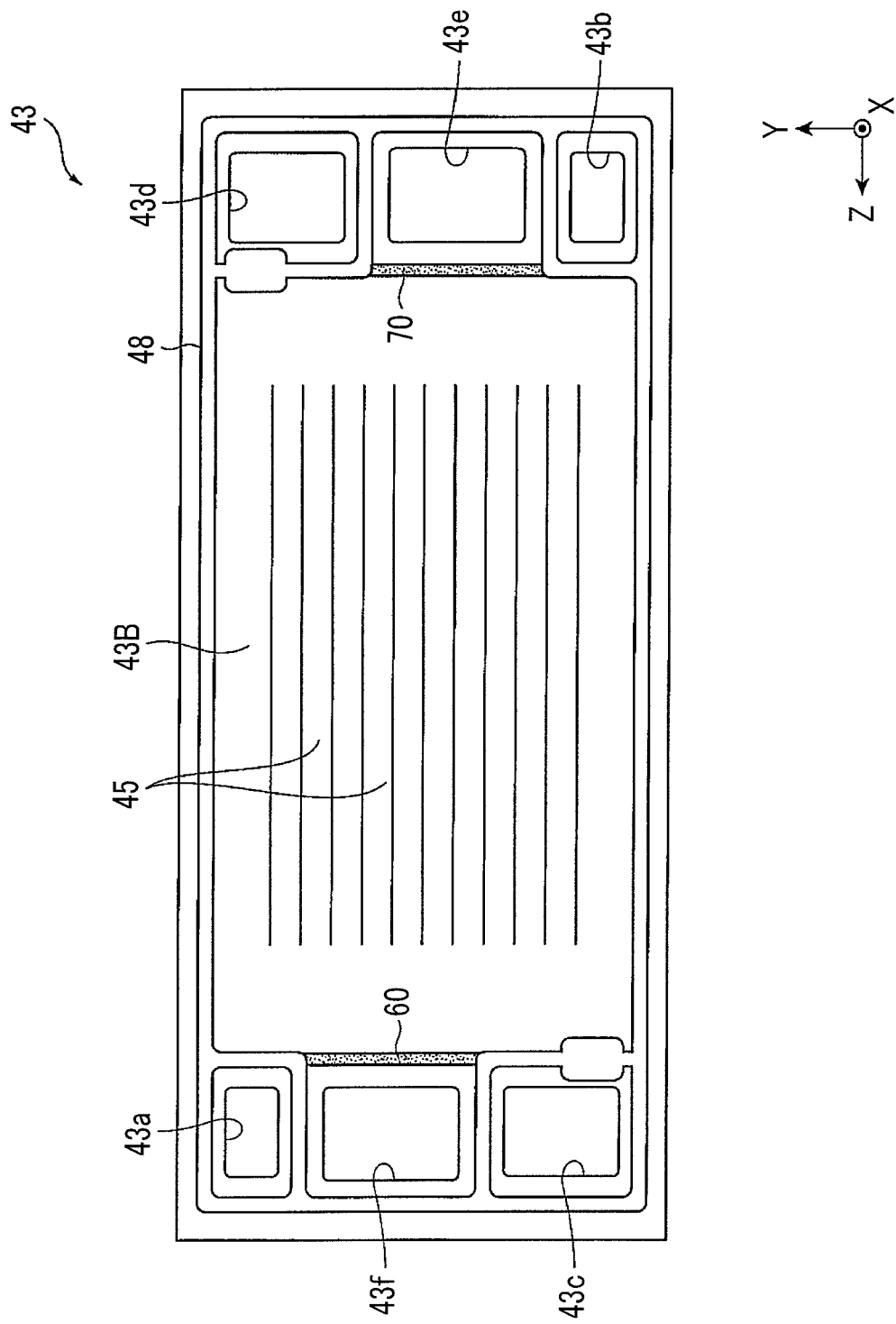
FIG. 4 is a plan view of the anode side separator of the fuel cell illustrated in FIG. 2 as viewed from the inside.

FIG. 3 is a schematic plan view of the anode side separator 43 illustrated in FIG. 2 as viewed from the outside which is the opposite side to the MEGA 41. FIG. 4 is a schematic plan view of the anode side separator 43 illustrated in FIG. 2 as viewed from the inside which is the MEGA 41 side. The anode side separator 43 and the cathode side separator 44 are formed of a member having gas barrier properties and electronic conductivity. As the material of the anode side separator 43 and the cathode side separator 44, for example, a carbon member such as dense carbon formed by compressing carbon particles so as not to cause gas to permeate therethrough, or a metal member such as press-formed stainless steel or titanium can be used. The separators 43, 44 of the embodiment are, for example, metal pressed separators.

At two opposite corners of the anode side separator 43 having a rectangular shape, a manifold hole 43a serving as an inlet for the fuel gas and a manifold hole 43b serving as an outlet for the fuel gas are respectively open. At the other two opposite corners of the separator 43, a manifold hole 43c serving as an inlet for the oxidant gas and a manifold hole 43d serving as an outlet for the oxidant gas are respectively open. At a first end and a second end in the horizontal direction Z of the center portion in the vertical direction Y of the separator 43, a manifold hole 43e serving as an inlet for the cooling medium and a manifold hole 43f serving as an outlet for the cooling medium are respectively open.

As illustrated in FIG. 3, a seal member 50 is disposed on the outer surface of the anode side separator 43 which is the opposite side to the MEGA 41. The seal member 50 is integrally molded in a frame shape surrounding each of the manifold holes 43a to 43d and a flow path surface 43A forming the flow path of the cooling medium. The seal member 50 abuts the outer surface of the cathode side separator 44 of another fuel cell 40 adjacent thereto when the fuel cells 40 are stacked, thereby sealing gaps between the two fuel cells 40.

Specifically, portions of the seal member 50 surrounding the manifold holes 43a, 43b are portions for suppressing the leakage of the fuel gas. Portions of the seal member 50 surrounding the manifold holes 43c, 43d are portions for suppressing the leakage of the oxidant gas. A portion of the seal member 50 surrounding the flow path surface 43A is a portion for suppressing the leakage of the cooling medium.

For example, the seal member 50 is formed by injection molding or press forming. As the material of the seal member 50, for example, rubber or a thermoplastic elastomer can be used. The seal member 50 is bonded and fixed to the separator by an adhesive. The anode side separator 43 has a recessed portion 48 in a region where the seal member 50 is disposed.

As illustrated in FIG. 4, on the inner surface of the anode side separator 43 which is the MEGA 41 side, the back side of the recessed portion 48 is a protruding portion which is raised. In a state in which the inner surface of the anode side separator 43 faces the MEGA 41, the manifold hole 43a serving as the inlet for the fuel gas and the manifold hole 43b serving as the outlet for the fuel gas communicate with each other via the flow path grooves 45 for the fuel gas, the flow path surface 43B, and gas flow paths 42g, 42h (see FIG. 5), which will be described later.

As illustrated in FIG. 4, on the inner surface of the anode side separator 43 which is the MEGA 41 side, seal members 60, 70 are disposed adjacent to the manifold holes 43e, 43f for the cooling medium. The seal members 60, 70 are provided to suppress the leakage of the fuel gas into the manifold holes 43e, 43f for the cooling medium. More specifically, the back side of the recessed portion 48 which is raised in a protruding shape on the inner surface of the anode side separator 43 surrounds the manifold holes 43a to 43d.

The first seal member 60 is disposed between the portion that surrounds the manifold hole 43a and the portion that surrounds the manifold hole 43c in the back side of the recessed portion 48 which is raised in a protruding shape. The second seal member 70 is disposed between the portion that surrounds the manifold hole 43b and the portion that surrounds the manifold hole 43d in the back side of the recessed portion 48 which is raised in a protruding shape. Gaps between the manifold holes 43a to 43d; the flow path surface 43B and the flow path grooves 45 for the fuel gas, and the manifold holes 43e, 43f for the cooling medium are blocked by the seal members 60, 70 and the portions of the back side of the recessed portion 48 raised in a protruding shape.

Figure 5:
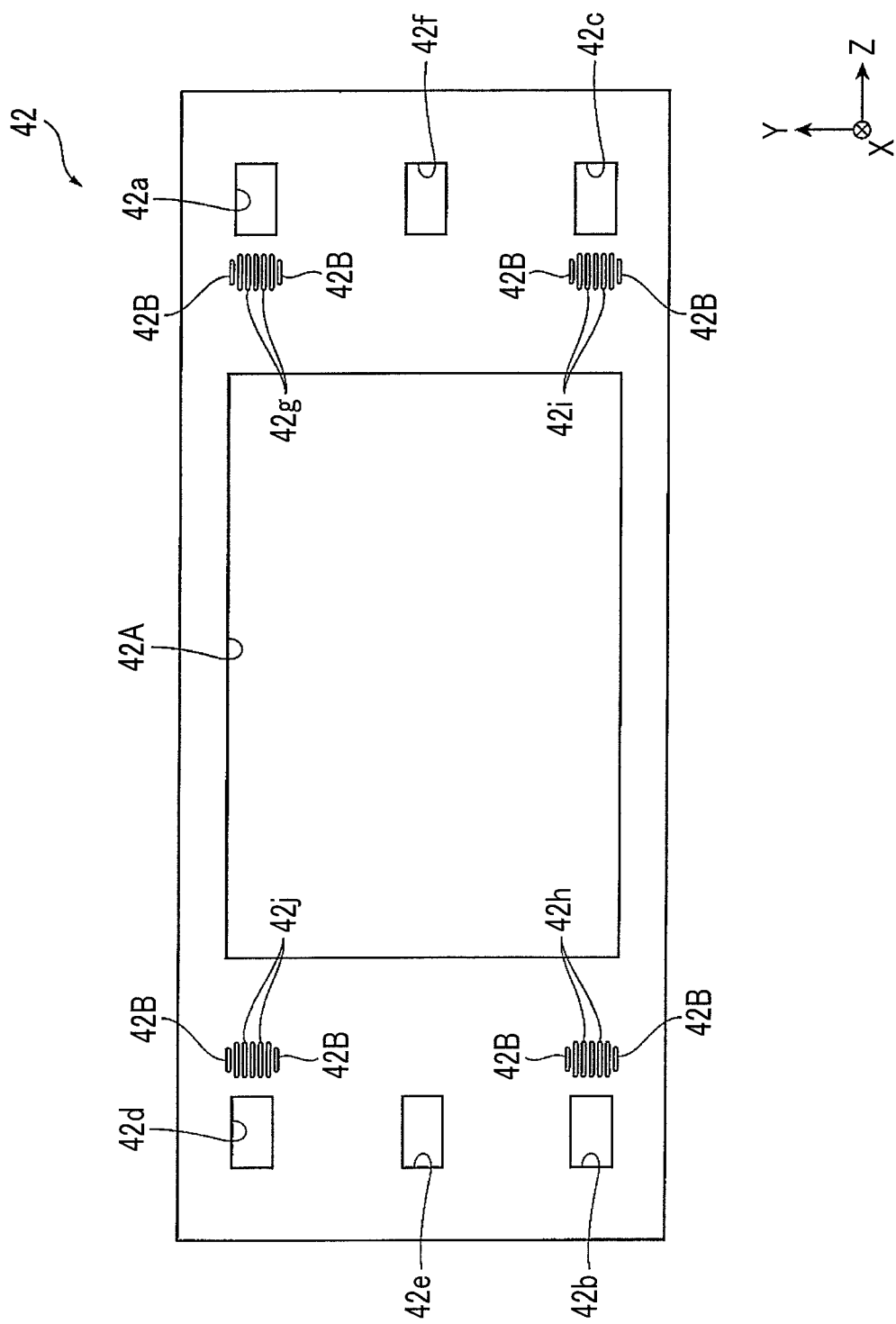
FIG. 5 is a plan view of a frame member of the fuel cell illustrated in FIG. 2.

FIG. 5 is a schematic plan view of the frame member 42 illustrated in FIG. 2 as viewed in the direction perpendicular to the surface of the frame member 42 facing the anode side separator 43. For example, the frame member 42 is formed in a frame shape surrounding the MEGA 41 by performing punching on a flexible film-like member that can be subjected to heat welding. The frame member 42 has manifold openings 42a to 42f that respectively communicate with the manifold holes 43a to 43f provided in the anode side separator 43, and an in-plane opening 42A in which the MEGA 41 is disposed.

The frame member 42 has a gas flow path 42g between the in-plane opening 42A and the manifold opening 42a. Similarly, the frame member 42 has a gas flow path 42h between the in-plane opening 42A and the manifold opening 42b. Similarly, the frame member 42 has a gas flow path 42i between the in-plane opening 42A and the manifold opening 42c. Similarly, the frame member 42 has a gas flow path 42j between the in-plane opening 42A and the manifold opening 42d.

In the example illustrated in FIG. 5, the gas flow paths 42g to 42j are a plurality of slit-shaped through-holes. The through-holes constituting the gas flow paths 42g to 42j are arranged in a shape of comb teeth at equal intervals. The gas flow paths 42g to 42j are not limited to the slit-shaped through-holes, and may be a plurality of through-holes or a single through-hole having any shape.

The frame member 42 includes accommodation portions 42B adjacent to the gas flow paths 42g to 42j. In the example illustrated in FIG. 5, the accommodation portion 42B is a slit-shaped through-hole similar to the gas flow paths 42g to 42j. The shape of the accommodation portion 42B is not limited to a slit-shaped through-hole, and may be a through-hole or a recessed portion having any shape. In the example shown in FIG. 5, each of the gas flow paths 42g to 42j is provided with a plurality of through-holes, but may also be provided with a single through-hole. The slit shape means an elongated hole shape having a narrow width extending in one direction.

Figure 6:
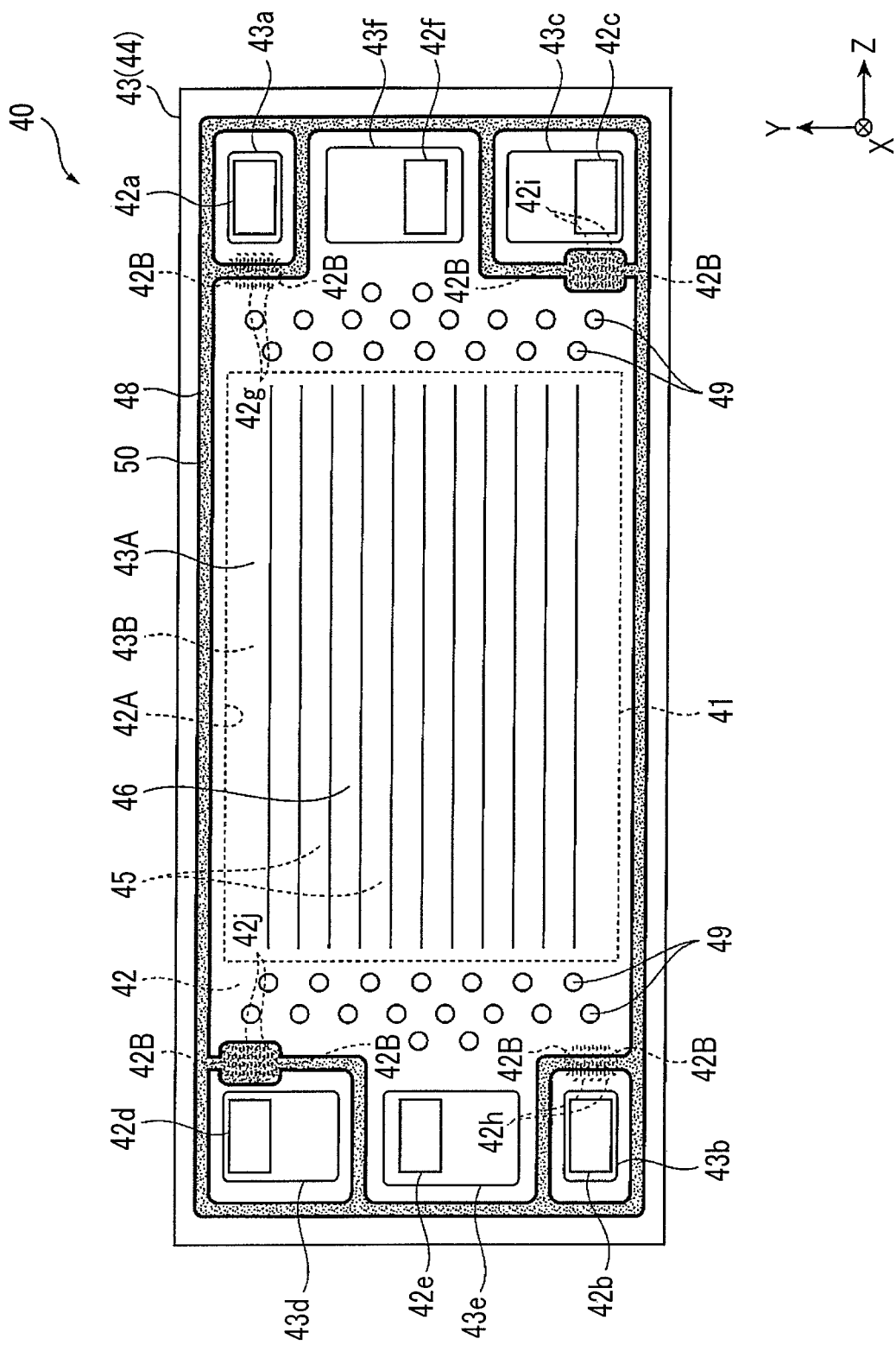
FIG. 6 is a plan view of the fuel cell illustrated in FIG. 1.

FIG. 6 is a plan view of the fuel cell 40 illustrated in FIG. 1 as viewed in the direction perpendicular to the outer surface of the anode side separator 43 which is the opposite side to the MEGA 41. In order to construct the fuel cell 40, first, the MEGA 41 is disposed in the in-plane opening 42A of the frame member 42, and the frame member 42 and the MEGA 41 are disposed between the separators 43, 44, thereby forming a stacked body. The stacked body is placed between molds, and heat pressing through which heat is applied while a pressure is applied is performed thereon to melt a portion of the frame member 42, so that the frame member 42 and the separators 43, 44 are welded together.

As described above, the anode side separator 43 of the fuel cell 40 has the recessed portion 48 on the outer surface on the opposite side to the frame member 42, and the back side of the recessed portion 48 on the inner surface facing the frame member 42 is raised in a protruding shape toward the frame member 42. The protruding portion of the back side of the recessed portion 48 abuts the frame member 42, and traverses the gas flow paths 42g, 42h so as to block the openings of the gas flow paths 42g, 42h excluding both end portions of the gas flow paths 42g, 42h which are the slit-shaped through-holes. The protruding portions of the back side of the recessed portion 48 are partially enlarged so as to block the entire openings of the gas flow paths 42i, 42j.

With the above-described configuration, the fuel gas supplied from the manifold hole 43a serving as the inlet for the fuel gas flows from the manifold opening 42a of the frame member 42 toward the gas flow path 42g via the gap between the anode side separator 43 and the frame member 42. The fuel gas flowing through the gap between the separator 43 and the frame member 42 toward the gas flow path 42g flows into the end portion of the gas flow path 42g as the slit-shaped through-hole adjacent to the manifold opening 42a. The fuel gas flowing into the gas flow path 42g flows through the gas flow path 42g from the end portion thereof adjacent to the manifold opening 42a toward the end portion thereof adjacent to the in-plane opening 42A.

The fuel gas flowing through the gas flow path 42g flows from the end portion of the gas flow path 42g adjacent to the in-plane opening 42A into the gap between the separator 43 and the frame member 42 surrounded by the protruding portion raised on the back side of the recessed portion 48 of the anode side separator 43. The fuel gas flowing into the inside of the protruding portion of the back side of the recessed portion 48 is distributed to the flow path grooves 45 of the separator 43, flows along the flow path surface 43B inside the separator 43, and is used for a reaction with the oxidant gas in the MEGA 41. The fuel gas which has not been used for the reaction with the oxidant gas reaches the gas flow path 42h adjacent to the manifold hole 43b serving as the outlet for the fuel gas.

The fuel gas that has reached the gas flow path 42h flows into the gas flow path 42h from the end portion of the gas flow path 42h adjacent to the in-plane opening 42A, and flows through the gas flow path 42h toward the end portion adjacent to the manifold hole 43b. The fuel gas flows through the gas flow path 42h from the inside surrounded by the protruding portion of the back side of the recessed portion 48 of the separator 43 toward the outside and flows out from the end portion of the gas flow path 42h adjacent to the manifold opening 42b. The fuel gas flowing out from the gas flow path 42h flows into the gap between the separator 43 and the frame member 42, and is discharged to the outside of the fuel cell module 100 through the manifold opening 42b and the manifold hole 43b of the stacked fuel cells 40.

Although not illustrated, similar to the anode side separator 43, the cathode side separator 44 of the fuel cell 40 has a recessed portion on the outer surface on the opposite side of the frame member 42, and the back side of the recessed portion on the inner surface facing the frame member 42 is raised in a protruding shape toward the frame member 42. The protruding portion of the back side of the recessed portion described above abuts the frame member 42, and traverses the gas flow paths 42i, 42j so as to block the openings of the gas flow paths 42i, 42j excluding both end portions of the gas flow paths 42i, 42j which are the slit-shaped through-holes. The protruding portions of the cathode side separator 44 are partially enlarged so as to block the entire openings of the gas flow paths 42g, 42h.

With the above-described configuration, the oxidant gas supplied from the manifold hole 43c serving as the inlet for the oxidant gas flows from the manifold opening 42c of the frame member 42 toward the gas flow path 42i via the gap between the cathode side separator 44 and the frame member 42. The oxidant gas flowing through the gap between the separator 44 and the frame member 42 toward the gas flow path 42i flows into the end portion of the gas flow path 42i as the slit-shaped through-hole adjacent to the manifold opening 42c. The oxidant gas flowing into the gas flow path 42i flows through the gas flow path 42i from the end portion thereof adjacent to the manifold opening 42c toward the end portion thereof adjacent to the in-plane opening 42A.

The oxidant gas flowing through the gas flow path 42i flows from the end portion of the gas flow path 42i adjacent to the in-plane opening 42A into the gap between the separator 44 and the frame member 42 surrounded by the protruding portion raised on the back side of the recessed portion of the cathode side separator 44. The oxidant gas flowing into the inside of the protruding portion of the back side of the recessed portion is distributed to the flow path grooves 47 of the separator 44, flows through the flow path surface inside the separator 44, and is used for a reaction with the fuel gas in the MEGA 41. The oxidant gas which has not been used for the reaction with the fuel gas reaches the gas flow path 42j adjacent to the manifold hole 43d serving as the outlet for the oxidant gas.

The oxidant gas that has reached the gas flow path 42j flows into the gas flow path 42j from the end portion of the gas flow path 42j adjacent to the in-plane opening 42A, and flows through the gas flow path 42j toward the end portion adjacent to the manifold hole 43d. The oxidant gas flows through the gas flow path 42j from the inside surrounded by the protruding portion of the back side of the recessed portion of the separator 44 toward the outside and flows out from the end portion of the gas flow path 42j adjacent to the manifold opening 42d. The oxidant gas flowing out from the gas flow path 42j flows into the gap between the separator 44 and the frame member 42, and is discharged to the outside of the fuel cell module 100 through the manifold opening 42d and the manifold hole 43d of the stacked fuel cells 40.

The cooling medium supplied from the manifold hole 43e as the inlet for the cooling medium is diffused via a first end of the anode side separator 43 where dimples 49 are provided, and flows through the flow path grooves 46 for the cooling medium. The cooling medium that flows through the flow path grooves 46 for the cooling medium passes through the manifold hole 43f as the outlet for the cooling medium via a second end where dimples 49 are provided and is discharged to the outside of the fuel cell module 100. In a state in which the fuel cells 40 are stacked, the manifold hole 43e serving as the inlet for the cooling medium, the flow path grooves 46 for the cooling medium, and the manifold hole 43f serving as the outlet for the cooling medium communicate with each other and form the flow path surface 43A for the cooling medium. The opening of each of the manifold holes 43a to 43f has a substantially rectangular shape.

As described above, the fuel cell 40 of the embodiment includes the MEGA 41 which is the membrane electrode gas diffusion layer assembly, the frame member 42 that surrounds the MEGA 41, and the separators 43, 44 with the frame member 42 and the MEGA 41 sandwiched therebetween. The separators 43, 44 includes the manifold holes 43a to 43d through which the reaction gas is supplied or discharged.

In the fuel cell 40 of the embodiment, as described above, the frame member 42 has the manifold openings 42a to 42d that communicate with the manifold holes 43a to 43d, and the in-plane opening 42A in which the MEGA 41 is disposed. As described above, the frame member 42 has the gas flow paths 42g to 42j which communicate with the in-plane opening 42A and the manifold openings 42a to 42d.

Figure 7:
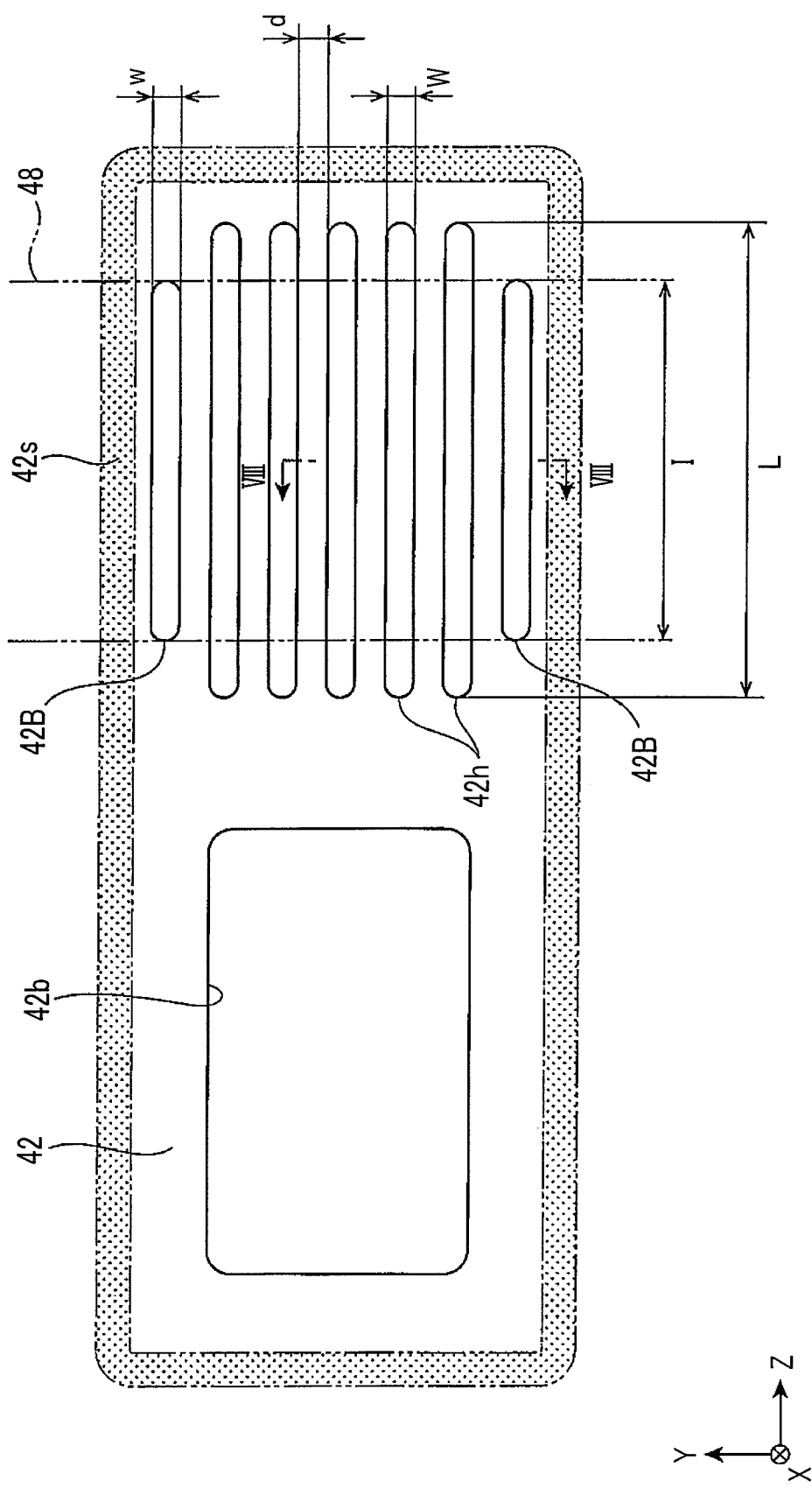
FIG. 7 is an enlarged view of the frame member illustrated in FIG. 5.

FIG. 7 is an enlarged view of the vicinity of the manifold opening 42b and the gas flow paths 42h of the frame member 42 illustrated in FIG. 5. The fuel cell 40 of the embodiment is characterized by the following configuration of the frame member 42. The frame member 42 includes a seal portion 42s welded to the separators 43, 44 around the gas flow paths 42g to 42j, and the accommodation portions 42B which are provided between the seal portion 42s and the gas flow paths 42g to 42j to accommodate the material of the frame member 42 that flows thereinto due to the welding.

In the fuel cell 40 of the embodiment, the gas flow paths 42g to 42j and the accommodation portions 42B are, for example, slit-shaped through-holes. The accommodation portion 42B is not limited to the slit-shaped through-hole as long as the accommodation portion 42B can accommodate the material of the frame member 42 that flows thereinto due to the welding, and may also be a recessed portion, groove, or through-hole having any shape. In the fuel cell 40 of the embodiment, the entire opening of the accommodation portion 42B is blocked by the protruding portion which is raised on the inner surface of the back side of the recessed portion 48 of the separator 43, which faces the MEGA 41, and thus the accommodation portion 42B does not communicate with the in-plane opening 42A and the manifold opening 42b.

As illustrated in FIG. 5, in the fuel cell 40 of the embodiment, the frame member 42 has the accommodation portions 42B for all the gas flow paths 42g, 42i, 42j in addition to the gas flow path 42h, similarly to the gas flow path 42h. The frame member 42 may not need to have the accommodation portions 42B for all the gas flow paths 42g to 42j, and may have the accommodation portions 42B for any one or more of the gas flow paths 42g to 42j.

As illustrated in FIGS. 5 and 7, in the fuel cell 40 of the embodiment, each of the gas flow path 42h and the accommodation portion 42B of the frame member 42 has a slit shape extending from the manifold opening 42b toward the in-plane opening 42A. The length 1 of the accommodation portion 42B in an extension direction is shorter than the length L of the gas flow path 42h in the extension direction.

In the fuel cell 40 of the embodiment, in the vertical direction Y intersecting the extension direction of the gas flow path 42h of the frame member 42, the interval d between the gas flow paths 42h adjacent to each other is substantially the same as the width W of the gas flow path 42h. Furthermore, in the fuel cell 40 of the embodiment, in the vertical direction Y intersecting the extension direction of the gas flow path 42h of the frame member 42, the width W of the gas flow path 42h and the width w of the accommodation portion 42B are substantially the same.

In the fuel cell 40 of the embodiment, in the vertical direction Y intersecting the extension direction of the gas flow path 42h of the frame member 42, the accommodation portions 42B are formed at both ends of the gas flow paths 42h. In other words, in the fuel cell 40 of the embodiment, the accommodation portions 42B are formed at the outermost positions in a direction intersecting a direction in which gas flows through the gas flow path 42h, that is, in a direction in which the gas flow paths 42h are arranged.

Hereinafter, the operation of the fuel cell 40 of the embodiment will be described.

Figure 8:
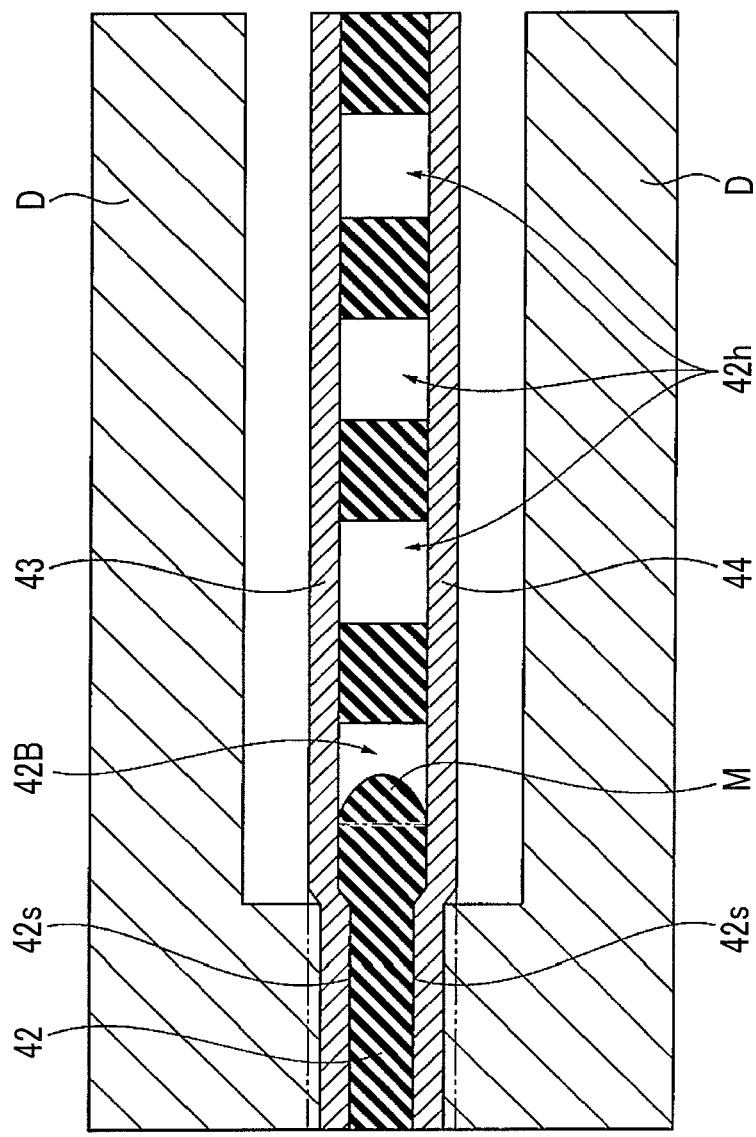
FIG. 8 is an enlarged sectional view for describing a process of welding the frame member to the separators illustrated in FIG. 2.

FIG. 8 is an enlarged sectional view taken along the line VIII-VIII in FIG. 7 for describing a process of welding the frame member 42 to the separators 43, 44 illustrated in FIG. 2. As described above, in order to construct the fuel cell 40, first, the MEGA 41 is disposed in the in-plane opening 42A of the frame member 42, and the frame member 42 and the MEGA 41 are disposed between the separators 43, 44, thereby forming a stacked body. The stacked body is placed between molds D, and a portion of the frame member 42 is melted by applying heat thereto while a pressure is applied thereto such that the frame member 42 and the separators 43, 44 are welded together. As described above, the seal portion 42s welded to the separators 43, 44 is formed in the frame member 42 around the gas flow path 42h.

At this time, there may be cases where a portion of the material M of the frame member 42 is heated and melted between the separators 43, 44 and is caused to flow from the seal portion 42s toward the gas flow path 42h by pressurization. Here, as described above, the frame member 42 of the fuel cell 40 of the embodiment includes the accommodation portions 42B which are provided between the seal portion 42s and the gas flow paths 42g to 42j to accommodate the material M of the frame member 42 caused to flow by welding.

Therefore, even if a portion of the material M of the frame member 42 is melted and caused to flow from the seal portion 42s toward the gas flow paths 42g to 42j by welding, the portion of the material M is accommodated by the accommodation portions 42B. As described above, a blockage in the gas flow paths 42g to 42j by the material M of the frame member 42 caused to flow by the welding can be suppressed, and a decrease in the opening size of the gas flow paths 42g to 42j can be suppressed. Therefore, with the fuel cell 40 of the embodiment, an increase in the pressure loss of the reaction gas is suppressed, so that the reaction gas can be uniformly supplied.

In the fuel cell 40 of the embodiment, the gas flow paths 42g to 42j and the accommodation portions 42B of the frame member 42 are the slit-shaped through-holes. As described above, the accommodation portions 42B can act as a dummy gas flow path 42h which receives the material of the frame member 42 caused to flow by the welding instead of the gas flow paths 42g to 42j which are narrow in width W and are easily blocked. Therefore, a blockage in the gas flow paths 42g to 42j by the material M of the frame member 42 can be more effectively suppressed. In the process of forming the gas flow paths 42g to 42j in the frame member 42, the accommodation portions 42B can be formed similar to the gas flow paths 42g to 42j.

In the fuel cell 40 of the embodiment, as described above, the entire opening of the accommodation portion 42B of the frame member 42 is blocked by the protruding portions of the separators 43, 44 and the accommodation portion 42B does not have a function as a flow path for the reaction gas. Therefore, even if the accommodation portion 42B is blocked by the material M of the frame member 42 caused to flow by the welding, this does not have an effect on the supply and discharge of the reaction gas, so that the reaction gas can be uniformly supplied.

In the fuel cell 40 of the embodiment, the gas flow path 42h and the accommodation portion 42B of the frame member 42 have a slit shape extending from the manifold opening 42b toward the in-plane opening 42A, and the length 1 of the accommodation portion 42B in the extension direction is shorter than the length L of the gas flow path 42h in the extension direction. As described above, the sealability between the fuel cells 40 can be improved by increasing the contact area between the frame member 42 and the separators 43, 44.

In the fuel cell 40 of the embodiment, in the direction intersecting the extension direction of the gas flow path 42h of the frame member 42, the interval d between the gas flow paths 42h adjacent to each other is substantially the same as the width W of the gas flow path 42h. In the fuel cell 40 of the embodiment, in the direction intersecting the extension direction of the gas flow path 42h of the frame member 42, the width W of the gas flow path 42h and the width w of the accommodation portion 42B are substantially the same. As described above, the sealability can be improved by stabilizing the contact between the frame member 42 and the separators 43, 44.

As described above, according to the embodiment, it is possible to provide the fuel cell 40 capable of suppressing an increase in the pressure loss of the reaction gas and uniformly supplying the reaction gas. The disclosure is not limited to the fuel cell 40 of the embodiment. Hereinafter, a modification example of the fuel cell 40 of the embodiment will be described.

FIG. 9 is an enlarged view of the frame member 42 corresponding to FIG. 7 illustrating a modification example of the fuel cell 40 of the embodiment. The fuel cell of the modification example is different from the fuel cell 40 described above in that a first end of the accommodation portion 42B of the frame member 42 communicates with the manifold openings 42a to 42d. Since the other configurations of the fuel cell of the modification example are the same as those of the fuel cell 40, like elements are denoted by like reference numerals, and descriptions thereof will be omitted.

Similarly to the fuel cell 40 described above, the fuel cell of the modification example has a configuration in which the frame member 42 is sandwiched between the separators 43, 44. The frame member 42 is welded to the separators 43, 44 at the seal portion 42s, but the gas flow paths 42g to 42j and the accommodation portions 42B are not welded together. Therefore, there is a possibility that moisture generated by the reaction between the fuel gas and the oxidant gas may infiltrate into the accommodation portion 42B via slight gaps between the frame member 42 and the separators 43, 44 which abut each other.

Here, in the fuel cell of the modification example, the first end of the accommodation portion 42B of the frame member 42 communicates with the manifold openings 42a to 42d. A second end of the accommodation portion 42B of the frame member 42 does not communicate with the in-plane opening 42A. More specifically, the position of the end portion of the accommodation portion 42B on the manifold openings 42a to 42d side may be aligned with the positions of the end portions of the gas flow paths 42g to 42j on the manifold openings 42a to 42d side. The position of the end portion of the accommodation portion 42B on the in-plane opening 42A side is positioned closer to the manifold openings 42a to 42d side than the positions of the end portions of the gas flow paths 42g to 42j on the in-plane opening 42A side, and the dimension of the accommodation portion 42B in the major axis direction is shorter than the dimensions of the gas flow paths 42g to 42j in the major axis direction.

As described above, the moisture infiltrating into the accommodation portion 42B is discharged toward the manifold openings 42a to 42d, so that accumulation of water in the accommodation portion 42B is suppressed. In the fuel cell of the modification example, similarly to the fuel cell 40 described above, as the accommodation portion 42B accommodates the material of the frame member 42 caused to flow by the welding, a blockage in the gas flow paths 42g to 42j is suppressed, so that a decrease in the opening size of the gas flow paths 42g to 42j can be suppressed.

Therefore, with the fuel cell of the modification example, similarly to the fuel cell 40 described above, an increase in the pressure loss of the reaction gas can be suppressed, and the reaction gas can be uniformly supplied. Moreover, moisture infiltrating into the accommodation portion 42B can be discharged toward the manifold openings 42a to 42d.

While the embodiment has been described above in detail with reference to the drawings, a specific configuration is not limited to the embodiment, and design changes and the like are included in the disclosure without departing from the gist of the disclosure.

What is claimed is:
1. A fuel cell comprising:
a membrane electrode gas diffusion layer assembly;
a frame member which surrounds the membrane electrode gas diffusion layer assembly; and
a pair of separators with the frame member and the membrane electrode gas diffusion layer assembly sandwiched between the separators, wherein:
the separators include a manifold hole through which a reaction gas is supplied or discharged; and
the frame member includes:
a manifold opening which communicates with the manifold hole,
an in-plane opening in which the membrane electrode gas diffusion layer assembly is disposed,
a gas flow path which communicates with the in-plane opening and the manifold opening,
a seal portion which is welded to the separators around the gas flow path, and
an accommodation portion which is defined between the seal portion and the gas flow path and configured to accommodate a material of the frame member caused to flow by the welding, wherein:
the pair of separators comprises an anode side separator;
the anode side separator comprises a recessed portion;
on an inner surface of the anode side separator facing the membrane electrode gas diffusion layer assembly, a back side of the recessed portion comprises a protruding portion that is raised;
the accommodation portion is formed at a position facing the protruding portion;
the gas flow path and the accommodation portion are slit-shaped through-holes;
the gas flow path and the accommodation portion have a slit extending from the manifold opening toward the in-plane opening; and
a length of the accommodation portion in a first extension direction in which the accommodation portion extends is shorter than a length of the gas flow path in a second extension direction in which the gas flow path extends.

2. The fuel cell according to claim 1, wherein a first end of the accommodation portion communicates with the manifold opening.

3. A fuel cell comprising:
a membrane electrode gas diffusion layer assembly;
a frame member which surrounds the membrane electrode gas diffusion layer assembly; and
a pair of separators with the frame member and the membrane electrode gas diffusion layer assembly sandwiched between the separators, wherein:
the separators include a manifold hole through which a reaction gas is supplied or discharged; and
the frame member includes:
a manifold opening which communicates with the manifold hole,
an in-plane opening in which the membrane electrode gas diffusion layer assembly is disposed,
a gas flow path which communicates with the in-plane opening and the manifold opening,
a seal portion which is welded to the separators around the gas flow path, and
an accommodation portion which is defined between the seal portion and the gas flow path and configured to accommodate a material of the frame member caused to flow by the welding, wherein:
the pair of separators comprises an anode side separator;
the anode side separator comprises a recessed portion;
on an inner surface of the anode side separator facing the membrane electrode gas diffusion layer assembly, a back side of the recessed portion comprises a protruding portion that is raised;
the accommodation portion is formed at a position facing the protruding portion, wherein the gas flow path and the accommodation portion are slit-shaped through-holes; and
in a third direction intersecting a second extension direction of the gas flow path, an interval between the gas flow paths adjacent to each other is the same as a width of the gas flow path.

4. The fuel cell according to claim 3, wherein, in the third direction intersecting the second extension direction of the gas flow path, the width of the gas flow path is the same as a width of the accommodation portion.

* * * * *